United States Patent [19]

Lin

[11] Patent Number: 5,015,040
[45] Date of Patent: May 14, 1991

[54] ELECTRONIC CONTROL DYNAMIC BRAKE PROPORTIONING

[75] Inventor: William C. Lin, Troy, Mich.

[73] Assignee: General Motors Corporation, Detroit, Mich.

[21] Appl. No.: 433,806

[22] Filed: Nov. 9, 1989

[51] Int. Cl.⁵ .................................................. B60T 8/82
[52] U.S. Cl. ................................... 303/93; 188/181 C; 303/100; 303/112
[58] Field of Search ............ 188/181 A, 181 C, 181 R, 188/181 T; 303/93, 96, 100, 110, 112

[56] References Cited

U.S. PATENT DOCUMENTS

| | | | |
|---|---|---|---|
| 3,779,331 | 12/1973 | Burckhardt et al. | 188/181 C X |
| 3,980,344 | 9/1976 | Burckhardt | 188/181 C X |
| 4,327,414 | 4/1982 | Klein | 303/93 |
| 4,505,520 | 3/1985 | Maehara | 188/181 C X |
| 4,724,935 | 2/1988 | Roper et al. | 303/110 X |
| 4,850,650 | 7/1989 | Eckert et al. | 303/9.62 |

*Primary Examiner*—Duane A. Reger
*Attorney, Agent, or Firm*—Howard N. Conkey

[57] ABSTRACT

Torque proportioning between the front and rear wheels of a vehicle is achieved by controlling the speed of each rear wheel, via modulation of the hydraulic brake pressure of the rear wheel during braking, to be the same as the speed of the front wheel on the same side of the vehicle.

3 Claims, 2 Drawing Sheets

ELECTRONIC CONTROL DYNAMIC BRAKE PROPORTIONING

BACKGROUND OF THE INVENTION

This invention relates to a brake proportioning system for the rear brakes of an automotive vehicle.

During braking of an automotive vehicle, the brake torque (the torque established by the wheel brakes resisting wheel rotation) generated by a hydraulic brake system causes the wheel to decelerate. As the wheel speed is reduced to a value lower than the speed of a hypothetical free-rolling wheel, wheel slip is established. As a result of wheel slip, a tire torque (the torque tending to decelerate the vehicle while resisting the brake torque) is established. Due to the difference in the normal forces on the front and rear wheels, the rear wheels will tend to experience a higher slip condition for a given brake torque. In order to provide a more balanced braking of the front and rear brakes of a vehicle and to establish desired vehicle braking characteristics and rear wheel braking performance, it is known to proportion the tire torques of the front and rear wheels to establish a desired relationship.

One proportioning technique establishes a rear wheel tire torque that is proportional to the front wheel tire torque according to the tire loading ratio. In other words, the proportion of the front to rear tire torques is established in accord with the ratio of the normal forces acting on the front and rear axles of the vehicle. Realizations of this technique have been pursued using load sensing mechanisms at the vehicle suspension in order to regulate the front and rear brake pressures in accord with the respective normal forces on the front and rear wheels. Other methods approximating the desired tire torques have been pursued using vehicle-deceleration sensitive proportioning valves for brake pressure regulation. Other systems employ a fixed ratio proportioning valve to establish a predetermined ratio between the front and rear brake torque values.

Yet other systems control the brake pressure applied to the wheels so as to establish a controlled slip value between the wheels and the road surface. However, this form of pressure control requires knowledge of vehicle speed during braking. Since the vehicle wheels are all experiencing a degree of slip relative to the road surface during braking, vehicle speed must either be estimated or measured by a transducer such as an accelerometer or a radar system.

SUMMARY OF THE INVENTION

It is the general object of this invention to provide for a brake proportioning system for the rear wheels of a vehicle that achieves substantially optimal front/rear brake proportioning without the requirement of providing a measurement of the normal loading on the front and rear wheels of the vehicle and without the requirement of an estimation of vehicle speed.

In accord with this invention, torque proportioning between the front and rear wheels of a vehicle is achieved by controlling the slip of the rear wheels to be the same as the slip of the front wheels but without requiring a vehicle speed reference from any means. This is accomplished by controlling the speed of the rear wheels, via modulation of the hydraulic brake pressure of the rear wheels during braking, to be the same as the speed of the front wheels. By imposing equality between the front and rear wheel speeds, the front and rear wheels will achieve equal slip thereby establishing the desired brake proportioning between the front and rear brakes.

In another aspect of this invention, the speed of the rear wheel on one side of the vehicle is controlled during braking at the speed of the front wheel on the same side.

In yet another aspect of the invention, the speeds of the front and rear wheels are normalized to eliminate errors that may be introduced as a result of variations in the sizes of the front and rear wheels.

DESCRIPTION OF THE DRAWINGS

The invention may be best understood by reference to the following description of a preferred embodiment and the drawings in which.

DESCRIPTION OF THE INVENTION

Figure 1:
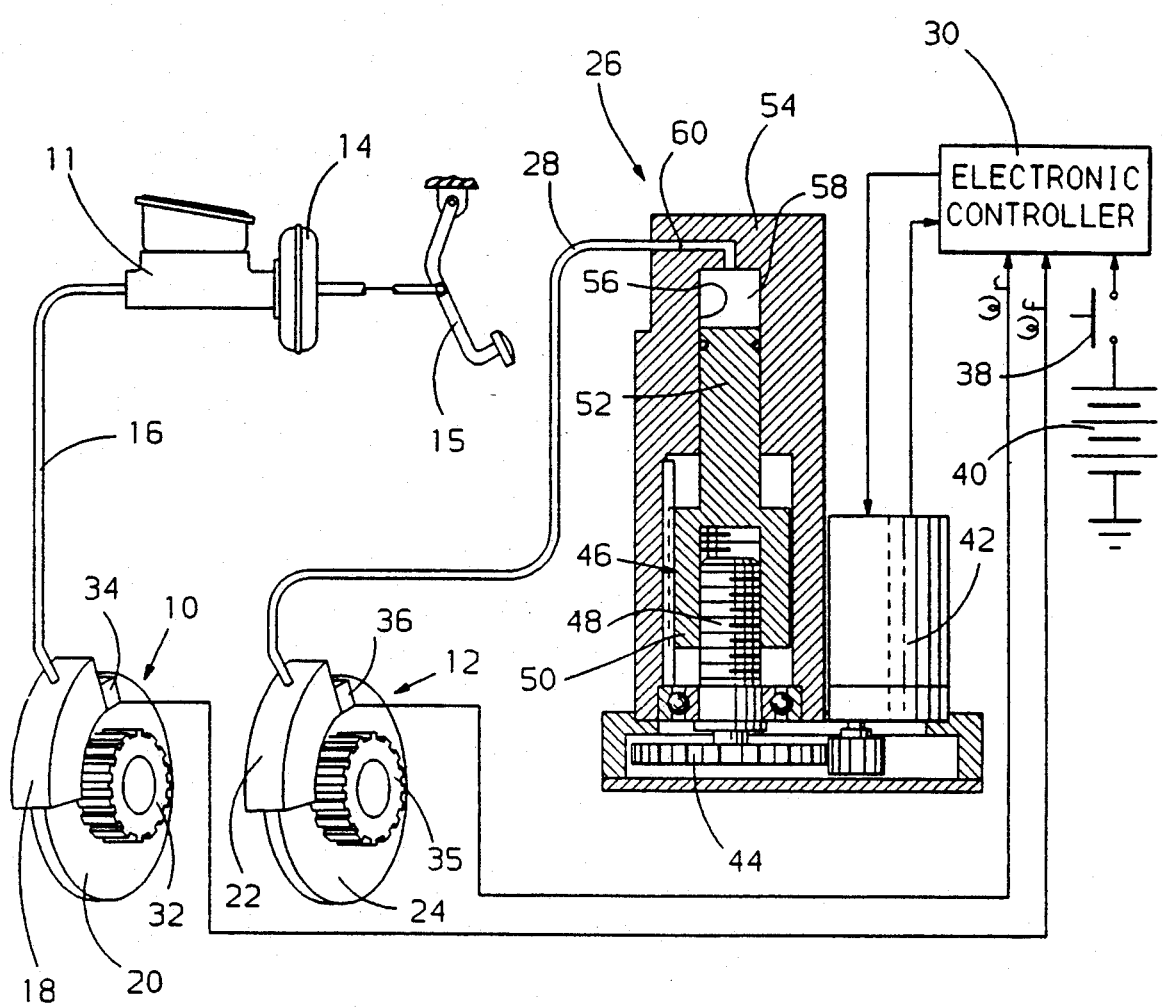
FIG. 1 is a general diagram of a braking system for the wheels on one side of a vehicle.
Figure 3:
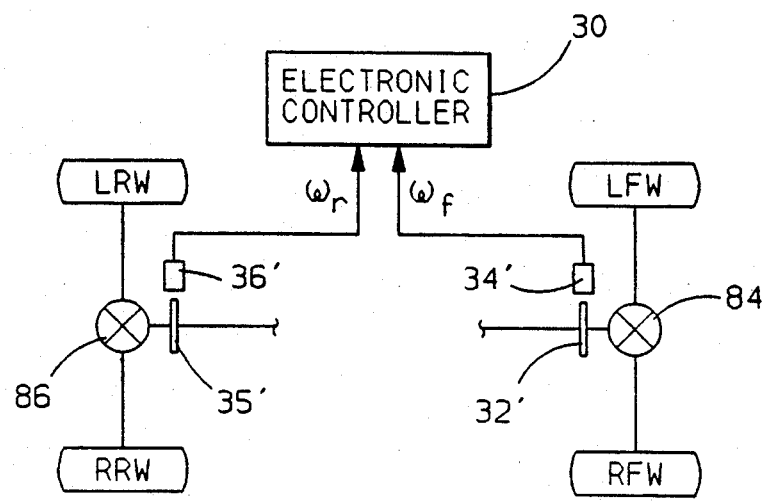
FIG. 3 illustrates wheel speed sensing for a four-wheel drive vehicle.

A general overview of the braking system for controlling the hydraulic pressure applied to the brakes of the front and rear wheels on the same side of a vehicle is illustrated in FIG. 1. The two wheels may be either the left wheels of a vehicle or the right wheels, it being understood that the other pair of wheels is controlled in like manner to achieve the desired brake proportioning.

The front wheel of the vehicle includes a brake unit 10 that is operated by hydraulic pressure provided by a master cylinder 11 and a hydraulic boost unit 14 operated by the vehicle operator via a brake pedal 15. The hydraulic fluid under pressure from the master cylinder 11 is provided to the brake unit 10 via a brake line 16. The brake unit 10 is illustrated as a conventional disk brake system that includes calipers 18 located at a rotor 20. As can be seen, the brake system for the front wheel is a conventional brake system for establishing a brake torque for braking the front wheel in accord with operator demand.

The rear wheel includes a brake unit 12 identical to the front wheel brake unit and includes calipers 22 operated by hydraulic pressure and which are located at a rotor 24. However, the hydraulic pressure at the rear brake unit 12 is established via a motor driven pressure modulator 26 which establishes the braking pressure at the calipers 22 via a brake line 28. The pressure modulator 26 is controlled to modulate the brake line pressure at the calipers 22 for establishing brake torque at the rear wheel by means of an electronic controller 30 in a manner so as to establish the speed $\omega_r$ of the rear wheel equal to the speed $\omega_f$ of the front wheel during vehicle braking.

In order to achieve equality between the front and rear wheel speeds during braking and thereby achieve the desired brake proportioning as will be described, speed signals representing the speeds $\omega_f$ and $\omega_r$ of the front and rear wheels, respectively, are provided to the electronic controller by wheel speed sensors on each of the front and rear wheels. Specifically, the front wheel includes a speed sensor comprised of an exciter ring 32 and an electromagnetic sensor 34 which monitors the rotation of the exciter ring 32 to provide a signal to the controller 30 having a frequency proportional to the front wheel speed $\omega_f$. Similarly, the rear wheel speed sensor includes an exciter ring 35 rotated with the rear wheel and an electromagnetic sensor 36 which monitors the rotation of the exciter ring 35 to provide a signal to the controller having a frequency proportional to the rear wheel speed $\omega_r$.

In addition to the foregoing wheel speed signals, the electronic controller 30 receives a brake signal indicating a braking condition via a standard brake switch 38 that is closed by operation of the vehicle brake pedal 15 by the vehicle operator and which couples a voltage signal from the vehicle battery 40 to the electronic controller 30. Upon receipt of the brake signal, the electronic controller 30 controls the motor driven pressure modulator 26 so as to achieve a rear wheel speed equal to the front rear wheel speed to thereby provide the desired brake proportioning in accord with this invention.

As viewed in FIG. 1, the pressure modulator 26 includes a DC torque motor 42 whose output shaft drives a gear train 44 which in turn rotates a linear screw actuator 46. The linear screw actuator 46 is comprised of a linear screw 48 which, when rotated, linearly positions a nut 50. The nut 50 terminates in a piston 52 such that as the linear screw 48 rotates, the piston 52 is either extended or retracted depending upon the direction of rotation of the torque motor 42.

The modulator 26 includes a housing 54 in which a cylinder 56 is formed. The piston 52 is reciprocally received within the cylinder 56 and defines therewith a chamber 58 that is filled with brake fluid. The modulator 26 has an outlet 60 from the chamber 58 which is connected to the brake unit 12 via the conduit 28.

The torque output of the torque motor 42 is related to the current therethrough as established by the electronic controller 30. In response to a motor current value, the torque motor 42 rotates its output shaft until the hydraulic pressure acting on the piston 50 offsets the torque output of the torque motor 42. In this embodiment, the linear screw actuator 48 and the motor 42 are back-drivable. In other words, the efficiency of the gears is high so that the motor output shaft is reverse driven by the hydraulic pressure acting on the piston 52 in the chamber 58 when it is greater than the torque output of the motor 42 until the hydraulic pressure is reduced to a level where it is overcome or offset by the torque output of the motor 42. Therefore, the braking pressure at the calipers 22 is established by controlling the current through the motor 42.

The electronic controller 30 includes a standard digital computer and a motor driver circuit responsive to a current command output of the digital computer for establishing a commanded current level in the DC torque motor 42.

As indicated, the digital computer within the electronic controller 30 is standard in form and includes a central processing unit which executes an operating program permanently stored in a read only memory which also stores tables and constants utilized in controlling the pressure to be applied to the rear brake unit 12 of the vehicle rear wheel. Contained within the central processing unit are conventional counters, registers, accumulators, flag flip flops, etc., along with a clock which provides a high frequency clock signal. The computer also includes a random access memory into which data may be temporarily stored and from which data may be read at various address locations determined in accord with the address stored in the ROM. The computer further includes a power control unit which receives battery voltage and provides regulated power to the various operating circuits in the computer. An input/output circuit provides an interface for providing the digital output command establishing the commanded current level of the motor 42. The input/output circuit of the digital computer also includes an input counter section which receives a pulse output from each of the wheel speed sensors 34 and 36. The respective wheel speed values $\omega_r$ and $\omega_f$ are then determined such as by determining the number of clock pulses between wheel speed pulses. Lastly, the input/output circuit includes a discrete input section to which the discrete output of the brake switch 38 is applied.

To establish the commanded motor current, the computer outputs a digital signal to an analog-to-digital converter in the motor driver circuit of the controller 30 which represents the commanded motor current and therefore the desired brake pressure to be applied to the rear brake unit 12. This current is then established in the motor 42 such as via a conventional closed loop current control circuit.

The desired relationship between the front and rear brake force at the tire/road interface is related to the tire loading ratio as set forth in the expression $$T_f/T_r = N_f/N_r \tag{1}$$

where $T_f$ and $T_r$ denote the tire torque at the front and rear wheels, respectively, and $N_f$ and $N_r$ denote the tire normal loading force at the front and rear wheels, respectively. The road surface coefficient of friction, $\mu$, is a function of the tire slip, $\lambda$, where $$\lambda = 1 - \omega/\omega_v \tag{2}$$

where $\omega$ is the wheel rotational speed and $\omega_v$ is the speed of a hypothetical free rolling wheel without the influence of a brake. In other words, $\omega_v$ is representative of vehicle speed. As long as the front and rear tires are similar and the road surfaces that the two tires on are similar, the two functions determining the coefficient of friction for these two surface contacts are also similar. Further, the front and rear tire torques tending to decelerate the vehicle are generated according to the amount of the road surface coefficient of friction and the tire normal loading force at the tire/road contacts as defined by the expressions $$T_f = \mu_f N_f, \quad T_r = \mu_r N_r \tag{3}$$

where $\mu_f$ and $\mu_r$ denote coefficients of friction of the road surface at the front and rear tire/road interface, respectively. A comparison of equation (3) with the requirement described in equation (1) indicates that the requirement of an ideal proportioning of the tire torque can be achieved if $$\mu_f = \mu_r \tag{4}$$

that is, the same coefficient of friction exists at the front and rear tire/road interfaces.

It then becomes the operating principle that the ideal tire torque proportioning can be achieved without the measurement of the tire loading forces by controlling the rear wheel slip to be the same as the front wheel slip. Wheel slip is generally obtained by the equation (2) which requires information of the wheel rotating speed, $\omega$ and the speed of a hypothetical free rolling wheel, $\omega_v$. The latter information is obtained by dividing vehicle speed by the radius of the wheel. Without the vehicle speed reference, wheel slip $\lambda$ cannot be obtained. However, since the front and rear wheels of the same side of the vehicle share the same linear vehicle speed, it can be understood that when these two wheels have the same rotational speed, $\omega_f = \omega_r$, they will have the same slip, that is, $$\lambda_f = 1 - \omega_f/\omega_v = 1 - \omega_r/\omega_v = \lambda_r \qquad (5)$$

where $\lambda_f$ is the slip of the front wheel and $\lambda_r$ is the slip of the rear wheel. Therefore, in accord with this invention, by controlling the rear wheel speed to follow the front wheel speed during a braking process, the ideal tire torque proportioning is obtained.

In the control of the rear wheel speed to equal the front wheel speed to obtain the brake proportioning, variation of the tire size may cause control errors. Even though the front and rear wheels share the same vehicle speed, their respective speeds of the hypothetical free-rolling wheel may not be the same if their wheel radius are different. Therefore, the wheel slips are expressed:

$$\lambda_f = 1 - \omega_f(V/R_{wf}); \lambda_r = 1 - \omega_r/(V/R_{wr}) \qquad (6)$$

where V is the linear vehicle velocity, $R_{wf}$ is the radius of the front wheel and $R_{wr}$ is the radius of the rear wheel.

The requirement of equation (5) for the same wheel slip then becomes $$\omega_f/(V/R_{wf}) = \omega_r/(V/R_{wr}) \qquad (7)$$

that leads to a modified requirement for the control of rear wheel speed during braking to achieve the optimum torque proportioning:

$$\omega_f = (R_{wr}/R_{wf})\omega_r \qquad (8)$$

The wheel speeds can be measured via the wheel speed measuring means above described with reference to FIG. 1. However, the ratio of the wheel radii needs to be available to the controller for control computation. With the provision of a brake discrete that differentiates the status of vehicle braking or non-braking, this ratio can be obtained. When the vehicle is not under a braking condition, the front and rear wheels are free-rolling which results in the same speed which is the vehicle speed, that is, $$\omega_f R_{wf} = V = \omega_r R_{wr} \qquad (9)$$

Therefore, the ratio of wheel radii can be computed when the vehicle is not under a braking condition in accord with the expression $$R_{wr}/R_{wf} = \omega_f/\omega_r. \qquad (10)$$

Once the ratio $\omega_f/\omega_r$ is obtained under a non-braking condition, the rear wheel speed may be normalized to the front wheel speed by determining a gain factor $A_r$ that is determined by the ratio of the front and rear wheel speeds during the non-braking condition, that is, $$A_r = \omega_f/\omega_r \qquad (11)$$

The rear wheel speed during braking is then adjusted by this normalization factor so that the system is independent of a difference in size in the front and rear wheels.

Figure 2:
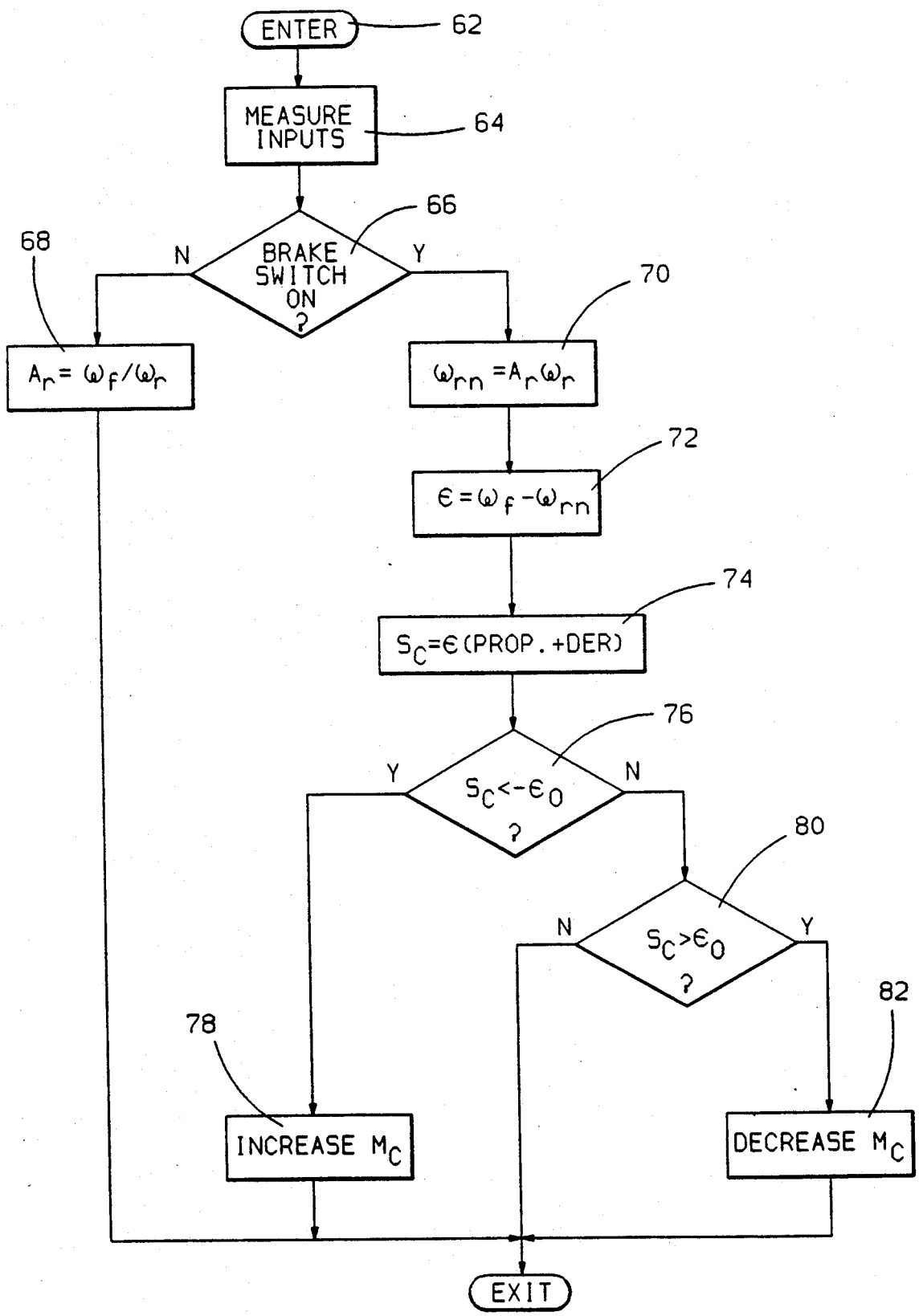
FIG. 2 is a flow chart illustrating the operation of the brake system of FIG. 1 to achieve brake proportioning in accord with the principles of this invention.

A flow chart of the control algorithm embodied in the program stored in the ROM of the digital computer in the electronic controller 30 is illustrated in FIG. 2. The routine defined by this flow chart is executed at repeated interrupt intervals such as 5 millisecond intervals. Referring to FIG. 2, the routine is entered at point 62 and proceeds to measure the various inputs at step 64. At this step, the front and rear wheel speeds $\omega_f$ and $\omega_r$ are computed and the status of the brake switch 38 is sampled. If the next step 66 determines that the brake switch 38 is open indicating the vehicle operator is not applying the vehicle brakes, a step 68 is executed to determine the gain factor $A_r$ (defined by equation (11)) utilized in normalizing the rear wheel speed to the front wheel speed. This gain factor is determined by computing the ratio $\omega_f/\omega_r$. Thereafter, the program exits the routine.

The foregoing steps are repeatedly executed at the interrupt interval until the vehicle operator initiates operation of the vehicle brakes. When so operated, the brake pressure applied to the front wheel brake unit 10 is controlled directly by the vehicle operator via the master cylinder 11. However, as previously described, the brake pressure applied to the rear brake unit 12 is controlled in accord with this invention via control of the pressure modulator 26.

Operation of the vehicle brakes is sensed at step 66 after which the rear wheel speed is normalized at step 70 to a value $\omega_{rn}$ by multiplying the rear wheel speed $\omega_r$ measured at step 64 by the gain factor $A_r$ computed at step 68. The error $\epsilon$ in the rear wheel speed is then determined by subtracting the normalized rear wheel speed $\omega_{rn}$ from the front wheel speed $\omega_f$. The value of a control signal $S_c$ is then determined based on the rear wheel speed error $\epsilon$. Typically, the control signal $S_c$ may comprise the sum of the error times respective proportional and derivative gains.

In the preferred embodiment, the motor 42 current is adjusted in direction causing the rear wheel speed to approach the front wheel speed when the absolute magnitude of the error based control signal $S_c$ is outside of a predetermined deadband. In this embodiment, the deadband is equal to $2\epsilon_o$. A condition in which the control signal $S_c$ is less than $-\epsilon_o$, indicating the control signal is outside of the deadband and the rear wheel speed is greater than the front wheel speed, is sensed at step 76 after which the program proceeds to step 78 where the motor current command $M_c$ is increased to increase the torque output of the motor 42 to increase the resulting pressure applied to the rear break unit 12. Conversely, if the control signal $S_c$ is not less than $-\epsilon_o$ (determined at step 76) but is determined at a step 80 to be greater than $\epsilon_o$, the control signal $S_c$ is outside of the deadband and the rear wheel speed is less than the front wheel speed. When this condition is sensed, the program proceeds to a step 82 where the motor current command $M_c$ is decreased to decrease the torque output of the torque motor 42 to thereby decrease the pressure applied to the rear wheel brake unit 12. If step 80 determines the control signal $S_c$ is not greater than $\epsilon_o$ indicating the absolute value of the control signal $S_c$ is within the deadband, the motor current command $M_c$ is not adjusted and the routine is exited.

As long as the brake switch 38 is closed, the steps 70 through 82 are repeatedly executed at the interrupt interval to control the pressure applied to the rear brake unit 12 to maintain the normalized rear wheel speed substantially at the front wheel speed thereby establishing the desired brake proportioning between the front and rear wheels.

When the subject invention is applied to a four wheel drive vehicle where the front and rear wheels LFW, RFW, LRW and RRW are driven through respective front and rear differential gears 84 and 86, the front wheel speed $\omega_f$ may be represented by the front differential gear input speed provided by exciter ring 32' and sensor 34' and the rear wheel speed $\omega_r$ may be represented by the rear differential gear input speed provided by exciter ring 35' and sensor 36'. During braking of the vehicle, brake torque applied in common to both rear wheels driven through the rear differential gears is controlled to achieve the same relationship between front and rear wheel speeds as set forth above.

The foregoing description of a preferred embodiment of the invention for the purpose of describing the invention is not to be considered as limiting or restricting the invention since many modifications may be made by exercise of skill in the art without departing from the scope of the invention.

The embodiments of the invention in which an exclusive property or privilege is claimed as defined as follows:

1. A brake control method for a vehicle having a front wheel brake unit for applying a brake torque to the front wheel in accord with a vehicle operator braking demand and a rear wheel brake unit for applying a brake torque to the rear wheel, the method comprising the steps of:
   sensing the rotational speed of the front wheel;
   sensing the rotational speed of the rear wheel;
   sensing the vehicle operator braking demand;
   determining a normalization factor, in the absence of a sensed vehicle operator braking demand, for normalizing the sensed rotational speed of the rear wheel to the sensed rotational speed of the front wheel;
   normalizing the sensed rotational speed of the rear wheel to the sensed rotational speed of the front wheel in accord with the determined normalization factor when a vehicle operator braking demand is sensed;
   comparing the rotational speed of the front wheel and the normalized sensed rotational speed of the rear wheel;
   controlling the rear wheel brake unit when a vehicle operator braking demand is sensed to (A) increase the applied brake torque to the rear wheel while the normalized sensed rotational speed of the rear wheel is greater than the sensed rotational speed of the front wheel and (B) decrease the applied brake torque to the rear wheel the normalized sensed rotational speed of the rear wheel is less than the sensed rotational speed of the front wheel, whereby the normalized sensed speed of the rear wheel is maintained substantially at the sensed rotational speed of the front wheel.

2. A brake control system for braking a front wheel and a rear wheel on a same side of a motor vehicle, the system comprising, in combination:
   means for sensing the rotational speed $\omega_f$ of the front wheel;
   means for sensing the rotational speed $\omega_r$ of the rear wheel;
   a front wheel brake unit for applying a brake torque to the front wheel in accord with a vehicle operator braking demand;
   a rear wheel brake unit for applying a brake torque to the rear wheel;
   means for sensing the vehicle operator braking demand; and
   control means for (A) determining a gain factor $A_r$ in accord with the expression $\omega_f/\omega_r$ in the absence of a sensed vehicle operator braking demand, (B) determining a normalized rotational speed $\omega_{rn}$ of the rear wheel in accord with the expression $A_r\omega_r$ when a vehicle operator braking demand is sensed, (C) comparing the rotational speed $\omega_f$ with the normalized rotational speed $\omega_{rn}$, and (D) controlling the rear wheel brake unit to apply a brake torque value to the rear wheel to establish the normalized rotational speed $\omega_{rn}$ substantially equal to the rotational speed $\omega_f$ of the front wheel.

3. A brake control system for braking front wheels and rear wheels of a motor vehicle having front and rear differentials for driving the front and rear wheels, the system comprising, in combination:
   means for sensing front differential gear input rotational speed $\omega_f$;
   means for sensing rear differential gear input rotational speed $\omega_r$;
   means for applying brake torque to the front wheels in accord with a vehicle operator braking demand;
   a rear brake unit for applying brake torque to the rear wheels;
   means for sensing the vehicle operator braking demand; and
   control means for (A) determining a gain factor $A_r$ in accord with the expression $\omega_f/\omega_r$ in the absence of a sensed vehicle operator braking demand, (B) determining a normalized rotational speed $\omega_{rn}$ of the rear differential gear input in accord with the expression $A_r\omega_r$ when a vehicle operator braking demand is sensed, (C) comparing the rotational speed $\omega_f$ with the normalized rotational speed $\omega_{rn}$, and (D) controlling the rear brake unit to apply a brake torque value to the rear wheels to establish the normalized rotational speed $\omega_{rn}$ substantially equal to the front differential gear rotational speed $\omega_f$.

* * * * *